United States Patent
Moon et al.

(10) Patent No.: US 12,548,778 B2
(45) Date of Patent: Feb. 10, 2026

(54) COPPER FOIL WITH HIGH ENERGY AT BREAK AND SECONDARY BATTERY COMPRISING THE SAME

(71) Applicant: Volta Energy Solutions S.a.r.l., Luxembourg (LU)

(72) Inventors: Honggi Moon, Wiltz (LU); Sangbeom Kim, Wiltz (LU); Seunghwan Kim, Wiltz (LU)

(73) Assignee: VOLTA ENERGY SOLUTIONS S.A.R.L., Luxembourg (LU)

( * ) Notice: Subject to any disclaimer, the term of this patent is extended or adjusted under 35 U.S.C. 154(b) by 0 days.

(21) Appl. No.: 17/509,682

(22) Filed: Oct. 25, 2021

(65) Prior Publication Data

US 2023/0111549 A1  Apr. 13, 2023

(30) Foreign Application Priority Data

Oct. 7, 2021  (WO) ................. PCT/EP2021/077772

(51) Int. Cl.
| | |
|---|---|
| *H01M 4/66* | (2006.01) |
| *C25D 1/04* | (2006.01) |
| *H01M 10/052* | (2010.01) |
| *H01M 4/02* | (2006.01) |

(52) U.S. Cl.
CPC ............. *H01M 4/667* (2013.01); *C25D 1/04* (2013.01); *H01M 4/661* (2013.01); *H01M 10/052* (2013.01); *H01M 2004/021* (2013.01); *H01M 2004/027* (2013.01)

(58) Field of Classification Search
CPC ................................. H01M 4/64; H01M 4/661
See application file for complete search history.

(56) References Cited

U.S. PATENT DOCUMENTS

| | | | |
|---|---|---|---|
| 9,711,799 B1 * | 7/2017 | Lai ........................... | C25D 1/04 |
| 10,205,170 B1 | 2/2019 | Huang et al. | |
| 10,622,637 B1 * | 4/2020 | Huang .................... | B32B 15/20 |
| 2012/0015206 A1 * | 1/2012 | Kim ....................... | H01M 4/667 |
| | | | 428/606 |
| 2019/0123358 A1 * | 4/2019 | Kudo .................... | H01M 4/661 |
| 2019/0173090 A1 * | 6/2019 | Liang ..................... | H01M 4/75 |
| 2020/0106102 A1 | 4/2020 | Huang et al. | |
| 2021/0167397 A1 * | 6/2021 | Kim .................... | H01M 4/0438 |
| 2021/0317590 A1 * | 10/2021 | Oguro ..................... | C25D 1/00 |
| 2021/0376331 A1 * | 12/2021 | Horie ..................... | H01M 4/66 |

FOREIGN PATENT DOCUMENTS

| | | | | |
|---|---|---|---|---|
| JP | 2008117655 A | * | 5/2008 | |
| JP | 2018-063930 | * | 4/2018 | ........... H01M 4/661 |
| KR | 10-2015-0050266 A | | 5/2015 | |
| KR | 10-1823187 B1 | | 1/2018 | |
| WO | 97/11210 A1 | | 3/1997 | |
| WO | WO-2021125410 A1 * | | 6/2021 | |

OTHER PUBLICATIONS

International Search Report with Written Opinion of the International Searching Authority dated May 6, 2022 in International Application No. PCT/EP2021/077772.

\* cited by examiner

*Primary Examiner* — Jeremiah R Smith
(74) *Attorney, Agent, or Firm* — Sughrue Mion, PLLC (57) ABSTRACT

A copper foil having high fracture energy to be strong against breakage is disclosed. An electrode for secondary batteries and a secondary battery exhibiting, by including the copper foil, excellent characteristics in terms of, for example, cycle lifespan, safety, and workability are also disclosed.

18 Claims, 3 Drawing Sheets

COPPER FOIL WITH HIGH ENERGY AT BREAK AND SECONDARY BATTERY COMPRISING THE SAME

CROSS REFERENCE TO RELATED APPLICATIONS

This application claims priority based on PCT/EP2021/077772 filed Oct. 7, 2021, of which the content is incorporated by reference in its entirety.

TECHNICAL FIELD

The present invention relates to a copper foil having high fracture energy to be strong against breakage, and to an electrode for secondary batteries and a secondary battery exhibiting, by including the copper foil, excellent characteristics in terms of, for example, cycle lifespan, safety, and workability.

DISCUSSION OF RELATED ART

Lithium secondary batteries, as compared to other secondary batteries, have lots of advantages, such as relatively high energy density and high operating voltage, as well as excellent preservation and lifespan characteristics. Accordingly, such lithium secondary batteries are widely used in various portable electronic devices such as personal computers, camcorders, portable telephones, portable CD players, PDA, and electric vehicles.

A copper foil is typically used as an anode (e.g., negative electrode) current collector of a lithium secondary battery, and examples thereof may include a rolled copper foil formed by a rolling processing or an electrolytic copper foil. In the case of such a rolled copper foil, the manufacturing cost is high, it is difficult to manufacture a copper foil having a wide width, and due to a lubricating oil that should be used during a rolling processing, adhesion with active materials may be reduced due to contamination of the lubricating oil, thus degrading charge/discharge cycle characteristics of the battery. In addition, while a thin current collector is needed to increase capacity of the lithium secondary battery, in the case of the rolled copper foil, the price rises sharply as the thickness increases. Accordingly, the electrolytic copper foil is widely used as an anode current collector for secondary batteries by improving physical properties of the electrolytic copper foil.

In order to improve charge/discharge cycle characteristics of lithium secondary batteries, there is a demand for a copper foil that may continuously withstand a volume change and heat generation of the lithium secondary batteries, and may not break even when an anode material is significantly expanded due to charging and discharging or even when the battery operates in an abnormally high temperature state.

Technical Objectives

Aspects of embodiments of the present invention are directed to a copper foil having high fracture energy (e.g., breaking energy) to be strong against break while securing sufficient bonding strength with an active material coated on a surface thereof.

Aspects of embodiments of the present invention are also directed to an electrode for secondary batteries using the copper foil and a secondary battery including the electrode for secondary batteries.

Other objectives and advantages of the present invention may be more clearly explained by the following detailed description and claims.

Technical Solution to the Problem

According to an embodiment, a copper foil includes: a copper layer; and an anti-corrosion layer formed on one surface and another surface of the copper layer, wherein a fracture energy by thickness (FE) of the copper foil according to the following Equation 1 is 0.5 N/μm or more:

$$FE = P/T_C \qquad \text{[Equation 1]}$$

wherein P is a fracture energy value measured according to an ASTM D4833 test method, and $T_C$ is a thickness of the copper foil.

In an embodiment, the fracture energy by thickness (FE) of the copper foil after heat treatment at 200° C. for 10 minutes may be 1.0 N/μm or more.

In an embodiment, the fracture energy by thickness (FE) of the copper foil after heat treatment at 200° C. for 10 minutes may be 120% or more of the fracture energy by thickness of the copper foil before the heat treatment.

In an embodiment, the fracture energy by thickness of the copper foil before the heat treatment may be in a range from 0.5 to 2.5 N/μm, and the fracture energy by thickness of the copper foil after the heat treatment may be in a range from 1.0 to 4.0 N/μm.

In an embodiment, a difference in surface roughness between the one surface and the another surface of the copper foil may be 1.0 μm or less, and a roughness (Rz) of each of the one surface and the another surface may be in a range from 0.5 to 4.0 μm.

In an embodiment, the copper foil may have a thickness in a range from 2 to 20 μm; an elongation in a range from 2 to 30%; and a tensile strength in a range from 20 to 70 kgf/mm².

In an embodiment, the anti-corrosion layer may include at least one of chromium (Cr), molybdenum (Mo), nickel (Ni), a silane compound, and a nitrogen compound.

In an embodiment, the copper foil may be an electrodeposition copper foil formed through electroplating in which a current is applied between an electrode plate and a rotating drum spaced apart from each other in an electrolyte, and the electrolyte may include 50 to 150 g/l of copper ions, 50 to 150 g/l of sulfuric acid, and 1000 ppm or less of TOC.

In an embodiment, the copper foil may be applied as an anode current collector of a lithium secondary battery.

In an embodiment, an electrode for secondary batteries including the copper foil, and a secondary battery including the electrode may be provided.

Effects of the Invention

According to one or more embodiments of the present invention, a copper foil is capable of continuously maintaining quality reliability without breakage even if it undergoes a high-temperature process performed during manufacture of a secondary battery and/or operates in an abnormally high-temperature state of the battery, and an electrode for secondary batteries and a secondary battery may exhibit, by including the copper foil, excellent cycle lifespan characteristics and safety.

The effects according to the present invention are not limited by the descriptions exemplified above, and more various effects are included in the present specification.

DETAILED DESCRIPTION OF THE INVENTION

Hereinafter, the present invention will be described in detail.

All terms (including technical and scientific terms) used in this specification may be used in the meaning commonly understood by those of ordinary skill in the art to which the present invention pertains, unless otherwise defined. In addition, terms defined in a commonly used dictionary are not to be interpreted ideally or excessively, unless clearly defined in particular.

In addition, throughout this specification, when a part "includes" or "comprises" a certain element, it is to be understood as an open-ended term that includes the possibility of further including other elements rather than excluding other elements, unless otherwise stated. In addition, throughout the specification, "on" or "above" means not only when it is located on or beneath a target part, but also includes the case where there is another part therebetween, and does not mean that it is located upwardly with respect to the direction of gravity. In the present specification, terms such as "first" and "second" do not indicate any order or importance but are used to distinguish components from each other.

As used herein, "preferred" and "preferably" refer to embodiments of the present invention that may provide certain advantages under certain circumstances. However, other embodiments may also be preferred, under the same or other circumstances. Additionally, the recitation of one or more preferred embodiments does not imply that other embodiments are not useful, nor is it intended to exclude other embodiments from the scope of the invention.

<Copper Foil>

A copper foil according to an embodiment of the present invention is an electro-deposition copper foil which is applicable as a current collector of a secondary battery, and may be differentiated from conventional copper foils in that a fracture energy (e.g., breaking energy) value by thickness of the copper foil is higher than that of the conventional copper foils.

In general, copper foils exhibit characteristics of a constant tensile strength regardless of thickness, whereas an elongation (e.g., an elongation rate) of the copper foils decreases as the thickness thereof decreases, and a fracture energy of the copper foils also tends to depend on the thickness. When such a thin copper foil is applied as an anode current collector of batteries, high-capacity characteristics of the battery may be promoted by increasing a loading amount of the active material, but there is a problem in that the copper foil may be easily torn, when an external force is applied or a high temperature is applied during a manufacturing process or operation of the battery, resulting in degradation of battery performance and safety.

On the other hand, the copper foil according to an embodiment of the present invention exhibits high energy at break (e.g., high fracture energy or breaking energy) with a thin thickness, as well as within a typical thickness range, and in particular, has a characteristic that the fracture energy significantly increases after heat treatment. When the copper foil having such high fracture resistance is applied as a current collector of secondary batteries, it may not only withstand a volume change and heat generation caused by charging and discharging of the battery, but may also fundamentally prevent the breakage of the electrode even when the battery operates in an abnormal state of the battery, thereby securing safety, stability and performance characteristics of the battery all together. In addition, high-capacity characteristics of the battery may be exhibited by increasing a loading amount of active materials applied on the copper foil.

Figure 1:
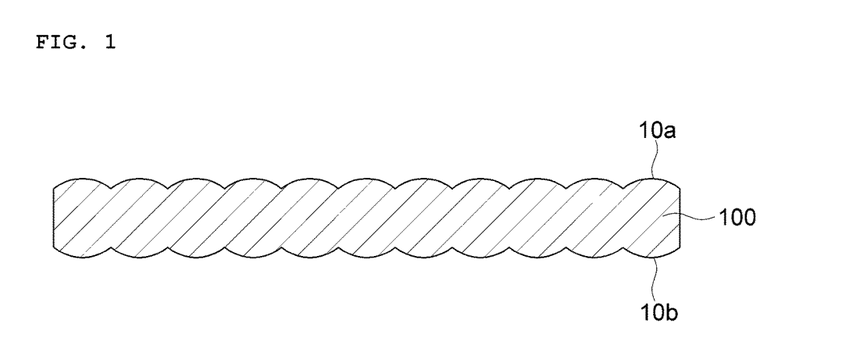
FIG. 1 is a cross-sectional view illustrating a structure of a copper foil according to an embodiment of the present invention.

A configuration of the copper foil according to an embodiment of the present invention will be described with reference to FIG. 1. FIG. 1 is a cross-sectional view illustrating a structure of a copper foil according to an embodiment of the present invention.

Referring to FIG. 1, a copper foil 100 according to an embodiment of the present invention may be an electrolytic copper foil including: a copper layer 100; and one surface 10a of the copper layer 100 and another surface 10b of the copper layer 100 which is a surface opposite to the one surface 10a and may have a fracture energy (FE) value by thickness (e.g., facture energy value for each thickness) of 0.5 N/μm or more.

In such a case, the fracture energy by thickness is a parameter that is newly defined in the present invention, and may be defined, for example, by Equation 1 below:

$$FE = P/T_C,\quad\quad\quad [\text{Equation 1}]$$

where in Equation 1,

P is a fracture energy value measured according to the ASTM D4833 test method, $T_C$ is a thickness of a copper foil, which is measured in a unit weight conversion method.

Mechanical properties of conventional copper foils have been typically analyzed by measuring tensile strength, yield strength, elongation, and the like. However, the above-described physical properties only analyze fragmentary physical properties of the copper foil, and in particular, in the case of a thin copper foil, there is a problem in that there is a significant deviation due to sampling.

On the other hand, the fracture energy by thickness (FE) newly adopted in the present invention corresponds to one of mechanical properties of the copper foil, and is differentiated from the aforementioned mechanical properties in that it shows a constant value regardless of the thickness of the copper foil. Specifically, the fracture energy by thickness (FE) is a new parameter which is useful for predicting and determining characteristics when the copper foil is manufactured, handled, and used, or, particularly, when applied to secondary batteries, by measuring an energy required when the copper foil is broken.

In the present invention, the fracture energy (FE) parameter may be affected by a thickness of the copper foil 100, a surface roughness of opposite surfaces (e.g., 10a and 10b), and the like. A numerical value of the fracture energy (FE) may be calculated with respect to a thickness of the copper foil in a range of 2 to 20 μm, for example, 4 to 15 μm, and specifically, a deviation thereof may be ±0.5 μm.

Specifically, the copper foil according to an embodiment of the present invention may have the fracture energy (FE) value by thickness in a range from 0.5 to 2.5 N/μm, and more specifically, 0.6 to 1.5 N/μm. In the case of the copper foil according to an embodiment of the present invention that satisfies the above-described fracture energy value, high reliability of products may be secured when it is applied to a battery by continuously maintaining cycle lifespan characteristics and safety of the battery without breakage even in an abnormal state.

In particular, the copper foil according to an embodiment of the present invention is characterized in that the fracture energy value is significantly increased after heat treatment, as compared to before heat treatment, thereby exhibiting high fracture resistance.

In an example, a fracture energy ($FE_A$) value by thickness of the copper foil after heat treatment at 200° C. for 10 minutes is 120% or more, and specifically 120 to 200%, of a fracture energy by thickness ($FE_B$) of the copper foil before heat treatment. More specifically, the fracture energy by thickness ($FE_B$) of the copper foil before heat treatment may be in a range from 0.5 to 2.5 N/μm, and the fracture energy by thickness ($FE_A$) of the copper foil after heat treatment may be in a range from 1.0 to 4.0 N/μm.

The copper foil 100 according to an embodiment of the present invention may be an electrolytic copper foil manufactured through a foil forming process by an electroplating method in which, for example, one surface of the copper foil has a shiny surface (e.g., an "S surface," a drum surface, etc.) 10a which has a relatively low roughness and thus has a high gloss and another surface of the copper foil has a matte surface (e.g., an "M surface", an electrolyte surface, etc.) 10b which has a relatively high roughness due to so-called mountain structures and thus has a low gloss.

In such a case, a bonding force with an active material and a yield of the battery may greatly vary depending on a surface state of the copper foil 100 which is used as the current collector. For example, when surface non-uniformity due to the surface roughness of the copper foil is too high, there is a problem in that a discharge-capacity retention rate of the secondary battery is lowered, and on the another hand, when the surface roughness of the copper foil is too low, it may be difficult to secure the binding force between the current collector and the active material, and thus the active material may be desorbed from the current collector during operation of the secondary battery, thereby causing problems such as an internal short circuit. In addition, according to a state of the copper foil, a difference in a coating amount of the active material between the opposite surfaces may be caused. The non-uniform coating amount between the opposite surfaces may cause a problem that a capacity of the electrode may decrease and/or unstable behavior of the electrode may occur due to a difference in deformation between the opposite surfaces of the current collector. Accordingly, in an embodiment of the present invention, by adjusting the surface roughness of the opposite surfaces of the copper foil 100 to a predetermined range, it is possible to secure required physical properties of the copper foil 100 as a current collector, that is, an excellent bonding strength with the active materials and a high discharge capacity retention rate.

In an example, a difference between a first surface roughness of the one surface 10a of the copper foil 100 and a second surface roughness of the another surface 10b of the copper foil 100 may be 1.0 μm or less, and specifically 0.5 μm or less.

In another example, the surface roughness of the opposite surfaces 10a and 10b of the copper foil 100 may be approximately 4.0 μm or less, and specifically may be in a range from 1.0 to 2.5 μm, in terms of Rz (ten-point average roughness). More specifically, the first surface roughness of the one surface of the copper foil, for example, the S surface 10a, may be in a range from 1.0 to 2.5 μm, and the second surface roughness of the M surface 10b may be in a range from 1.0 to 2.5 μm.

In addition, the thickness of the copper foil 100 may have a typical thickness range known in the art, for example, in a range from 2 μm to 20 μm. Specifically, it may be in a range from 4 to 15 μm, but the present invention is not particularly limited thereto. When the thickness of the copper foil 100 is too thin to be less than about 2 μm, it is difficult to handle the copper foil in a process of manufacturing the battery, lowering the workability, and on the other hand, when the thickness of the copper foil 100 exceeds about 20 μm, it is difficult to manufacture a high-capacity battery because volume and weight may increase due to a thickness of a current collector when the copper foil 100 is used as a current collector.

The copper foil 100 according to an embodiment of the present invention preferably has excellent elongation and tensile strength in consideration of mechanical hardness, flexibility and product reliability, but does not require particularly high values.

In an example, the copper foil 100 may have an elongation in a range from 2 to 30% and a tensile strength in a range from 20 to 70 kgf/mm². More specifically, the elongation of the copper foil may be in a range from 2 to 25%, and in particular, it is preferable to adjust the elongation of the copper foil to a range from 2.5 to 35% after heat treatment at 200° C. In addition, the tensile strength of the copper foil may be in a range from 20 to 70 kgf/mm², and specifically, the tensile strength of the copper foil after heat treatment at 200° C. for 10 minutes may be in a range from 20 to 65 kgf/mm².

The copper foil 100 according to an embodiment of the present invention is not particularly limited in terms of, for example, components, composition, and/or structure constituting the copper foil, as long as the above-described fracture energy (FE) parameters and related characteristics are satisfied.

The copper foil 100 may include or be formed of conventional copper or a copper alloy known in the art, and a metal component included in the alloy is not particularly limited, and a conventional metal known in the art may be used.

In an example, the copper foil 100 is preferably an electro-deposition copper foil formed through electroplating in which a current is applied between an electrode plate and a rotating drum spaced apart from each other in an electrolyte. The electrolyte may have a composition including 50 to 150 g/l of copper ions, 50 to 150 g/l of sulfuric acid, and 1,000 ppm or less of TOC, but the present invention is not limited thereto.

The copper foil 100 may be a typical copper foil, a double-sided glossy copper foil, a high elongation copper foil, and/or a high strength copper foil by adjusting the type and/or content of applied additives, but the present invention is not particularly limited thereto. The copper foil 100 may be in the shape of a foil, specifically, may be a planar (e.g., flat-type) copper foil.

In addition, unless otherwise specified, the above-described physical properties may be based on a thickness in a range from 2 to 20 μm of the copper foil. However, embodiments of the present invention are not limited to the above-described thickness range, and may be appropriately adjusted within a typical thickness range known in the art.

Figure 2:
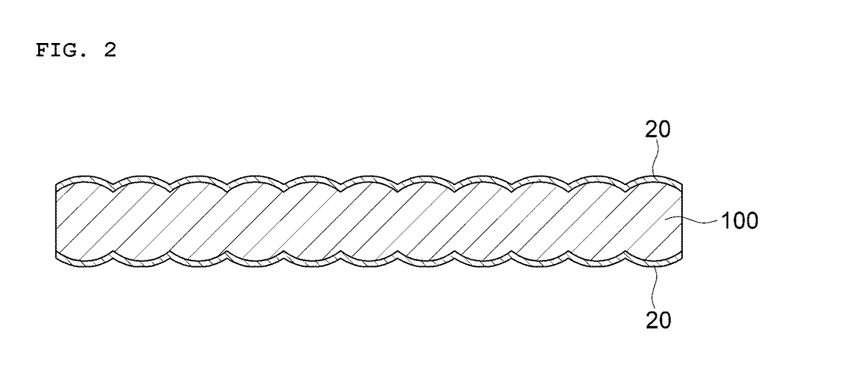
FIG. 2 is a cross-sectional view illustrating a structure of a copper foil according to another embodiment of the present invention.

In an embodiment, referring to FIG. 2, the copper foil 100 according to an embodiment of the present invention may include an anti-corrosion layer 20 formed on the surfaces 10a and 10b thereof.

The anti-corrosion layer 20 is selectively formed on the surfaces 10a and 10b of the copper foil 100 to prevent corrosion (e.g., rust). The anti-corrosion layer 20 may include conventional inorganic corrosion-resistant (e.g., rust-preventive) materials, organic corrosion-resistant materials, or mixtures thereof known in the art, for example, at least one or more of chromium (Cr), molybdenum (Mo), nickel (Ni), a silane compound, and a nitrogen compound.

In such a case, the nitrogen compound may include at least one or more of common triazole compounds and amine compounds known in the art. The applicable triazole compound may be selected from, for example, benzotriazole, tolyltriazole, carboxybenzotriazole, chlorobenzotriazole, ethylbenzotriazole and naphthotriazole. In addition, available amine compounds may be selected from, for example, amide, acrylamide, acetamide, auramine, dodecyltrimethyl ammonium bromide (DTAB) and diethylenetriamine (DETA).

The anti-corrosion layer 20 may serve to impart not only the anti-corrosion properties to the copper foil 100 described above, but also heat-resistance properties and/or properties to increase a bonding strength with active materials.

The copper foil 100 according to an embodiment of the present invention may be manufactured through a conventional electrolytic foil-forming apparatus. For example, a drum, which serves as a cathode, and an anode are installed in a container to which an electrolyte is continuously supplied, and a current is applied in a state that the drum and the anode are spaced apart from each other so that the electrolyte may be interposed therebetween. In such a case, as the drum rotates, an electrolytic copper foil is electro-deposited on a surface of the drum, and then it is wound through a guide roll.

In such a case, a conventional electroplating electrolyte component known in the art may be used as the electrolyte without particular limitation. For example, the electrolyte may include copper sulfate, sulfuric acid and a trace amount of chlorine as main components and may include at least one conventional additive.

In an example, the electrolyte may include organic impurities (TOC) with a concentration limited to 1,000 ppm or less in a copper sulfate including 50 to 100 g/L of copper and 50 to 150 g/L of sulfuric acid.

In addition, additives commonly used in the field of electroplating may be used without limitation. For example, a sulphonate-based additive including sulfide as an accelerator (brightener) for imparting gloss to a plating surface and obtaining a fine plating layer; PEG (polyethylene glycols), PPG (polypropylene glycols), polyvinyl alcohols, or gelatin having a molecular weight in a range from about 1,000 to 100,000 as a carrier for controlling roughness of the copper foil; a cellulose-based additive as a suppressor to realize stable low illuminance, or a mixture of one or more thereof may be included. Applicable organic additives may include HEC (Hydroxyethyl Cellulose), 3-(benzothiazolyl-2-mercapto)-propyl-sulfonic acid, and low molecular weight nitrides (e.g., thiourea-based, amides, benzimidazole-based, benthiazol-based, dimethyl aniline, etc.) which are levelers that lower roughness of the copper foil and imparts high-strength properties As a specific example of the above-described additives, 1 to 30 mg/L of HEC, 0.1 to 15 mg/L of bis-(3-sulfopropyl) disulfide (SPS) and/or 3-mercaptopropyl sulfonate (MPS) as a brightener/accelerator, 3 to 50 mg/L of polymer gelatin, 0.01 to 10 mg/L of thiourea and the like may be used, but the present invention is not particularly limited thereto.

In addition, the electroplating conditions applied at the time of electro-deposition of the copper foil are not particularly limited, and may be appropriately adjusted within a range known in the art. As an example, a current density may be in a range from 30 ASD to 100 ASD, and a temperature of the electrolyte may be in a range from 35 to 75° C.

Factors such as a difference in surface roughness between the M-surface (e.g., 10a) and the S-surface (e.g., 10b) of the copper foil may be controlled by controlling the composition of the aforementioned electrolyte, the current density, the temperature, the type and/or content of the additive.

<Electrode>

Another embodiment of the present invention is an electrode for secondary batteries including the above-described copper foil as a current collector.

In a lithium secondary battery, for example, a foil including aluminum (Al) is generally used as a cathode (e.g., positive electrode) current collector combined with a cathode active material, and a foil including copper (Cu) is generally used as an anode (e.g., negative electrode) current collector combined with an anode active material. Accordingly, in the present invention, a case in which the copper foil 100 is applied as an anode current collector will be described.

In an example, the anode includes the above-mentioned copper foil; and an anode active material layer disposed on the copper foil.

The anode active material layer includes an anode active material, and may further include a conventional binder and/or a conductive material known in the art.

The anode active material is not particularly limited as long as it is a compound capable of intercalation and deintercalation of ions. Non-limiting examples of applicable anode active materials may include, but may not be limited to, carbon-based and silicon-based anode active materials, and in addition, lithium metal or alloys thereof, and other metal oxides such as $TiO_2$, $SnO_2$ and $Li_4Ti_5O_{12}$ capable of occluding and releasing lithium and having an electric potential of less than 2 V with respect to lithium may be used.

Since a method of manufacturing an electrode for secondary batteries using the above-described copper foil is known to those skilled in the art to which the present invention pertains, a detailed description thereof will be omitted.

<Secondary Battery>

A secondary battery according to another embodiment of the present invention includes an anode (e.g., negative electrode) including the above-described copper foil.

The secondary battery may be a lithium secondary battery, and specifically, may include a lithium metal secondary battery, a lithium ion secondary battery, a lithium polymer secondary battery, a lithium ion polymer secondary battery, or the like.

In an example, the lithium secondary battery may include a cathode (e.g., positive electrode) including a cathode active material; an anode (e.g., negative electrode) including an anode active material; and an electrolyte interposed between the cathode and the anode. In addition, a separator may further be included.

The lithium secondary battery according to an embodiment of the present invention may be manufactured according to conventional methods known in the art, for example, by interposing a separator between the cathode and the anode and then introducing the electrolyte to which the electrolyte additive is added.

The electrolyte may include conventional lithium salts known in the art; and an electrolyte solvent.

As the separator, a porous separator, for example, a polypropylene-based, polyethylene-based, or polyolefin-based porous separator may be used, or an organic/inorganic composite separator including an inorganic material may be used.

Hereinafter, the present invention will be described in detail through embodiments. However, the following embodiments are only to illustrate the present invention, and the present invention is not limited by the following embodiments.

Examples 1-3

For preparation of an electrolyte, conditions were adjusted to a temperature of 55° C., a sulfuric acid concentration of 100 g/l, a copper ion concentration of 100 g/l, and a halogen ion concentration of 30 ppm, and 5 ppm of HEC, 7 ppm of gelatin, and 2.5 ppm of MPS were added as additives with respect to an added amount. In addition, a current density was 65 ASD, and 6 μm, 8 μm, and 10 μm were prepared according to adjustment of drum speed. Thereafter, chromium (Cr) treatment was performed through immersion in a small tank to impart anti-corrosion ability.

The prepared copper foil was sampled in three places (left, center, right) with a full width (1300 mm*500 mm), and physical properties of the copper foil were measured as in Experimental Examples 1 and 2 below. Specifically, a thickness was measured by a basis weight (e.g., grammage) method, and tensile strength, elongation, and fracture energy were each measured by UTM (Universal Testing Machine), and roughness was measured using a roughness meter. In addition, a fracture energy of the copper foil was measured after heat treatment at 200° C. for 10 minutes.

Comparative Examples 1-3

For preparation of an electrolyte, conditions were adjusted to a temperature of 55° C., a sulfuric acid concentration of 100 g/l, a copper ion concentration of 100 g/l, and a halogen ion concentration of 10 ppm, and 5 ppm of HEC, 7 ppm of gelatin, and 0.2 ppm of MPS were added as additives with respect to an added amount. In addition, a current density was 65 ASD, and 6 μm, 8 μm, and 10 μm were prepared according to adjustment of drum speed. Thereafter, chromium (Cr) treatment was performed through immersion in a small tank to impart anti-corrosion ability. Then, physical properties of the copper foil were measured in the same manner as in Example 1.

Experimental Example 1: Evaluation of Physical Properties of Copper Foil

The copper foils of Examples 1 to 3 and Comparative Examples 1 to 3 were evaluated for physical properties in the following manner, and the results are shown in Table 1 below.

<Method for Evaluating Physical Properties>

(1) Thickness Measurement

A thickness was measured by a unit basis weight method, which is a typical thickness measurement method of copper foil (IPC-TM-650 2.2.12).

(2) Surface Roughness Measurement

A roughness of the copper foil was measured based on Rz using a shape measuring instrument (MarSurf, model name: M 300 C Mobile roughness measuring instrument) (IPC-TM-650 2.2.17).

(3) Measurement of Elongation and Tensile Strength

A tensile strength (MPa) and an elongation were each measured using UTM (Instron, model name: 5942) in accordance with IPC-TM-650 2.4.18 standard.

(4) Fracture Energy (Puncture Test)

Figure 3:
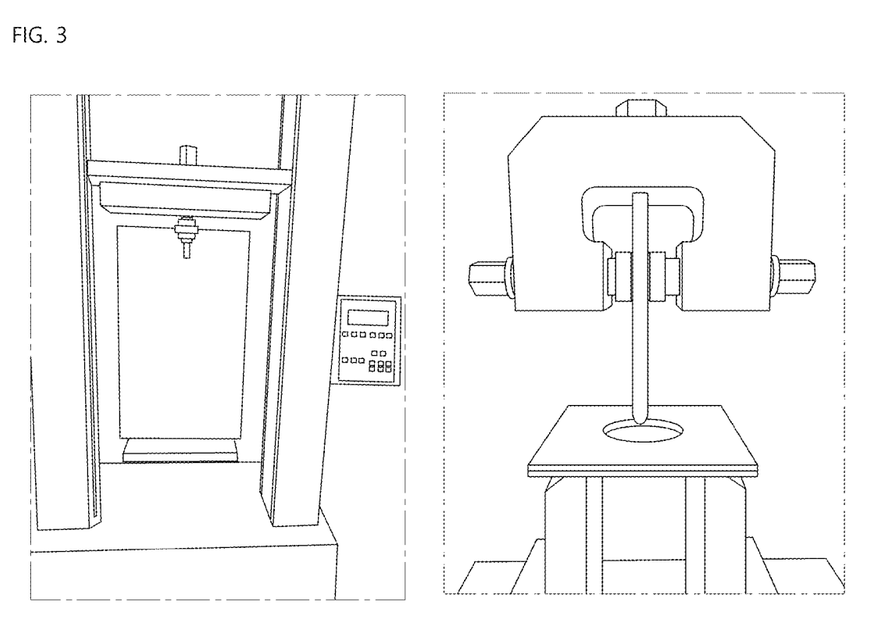
FIG. 3 illustrates an ASTM D4833 test method.

A fracture energy (e.g., breaking energy) was measured according to a test method according to ASTM D4833 (Standard Test for Index Puncture Resistance of Geosynthetics, Geomembranes, And Related Products) as in FIG. 3 below. The universal testing machine was used for the test equipment. For example, a sample was secured between clamp plates having a hole which has an inner diameter of 44.45 mm, and then a steel rod having a diameter (probe diameter) of 7.9 mm, a height of 127 mm, and a rod-end radius of 3.97 mm was used to penetrate the sample at a speed of 300 mm/min, thereby measuring a maximum load (e.g., maximum weight, fracture energy) (N). The test environment was under the conditions of a temperature of 23±2° C. and a humidity (R.H.) of 45±5%.

Figure 4A:
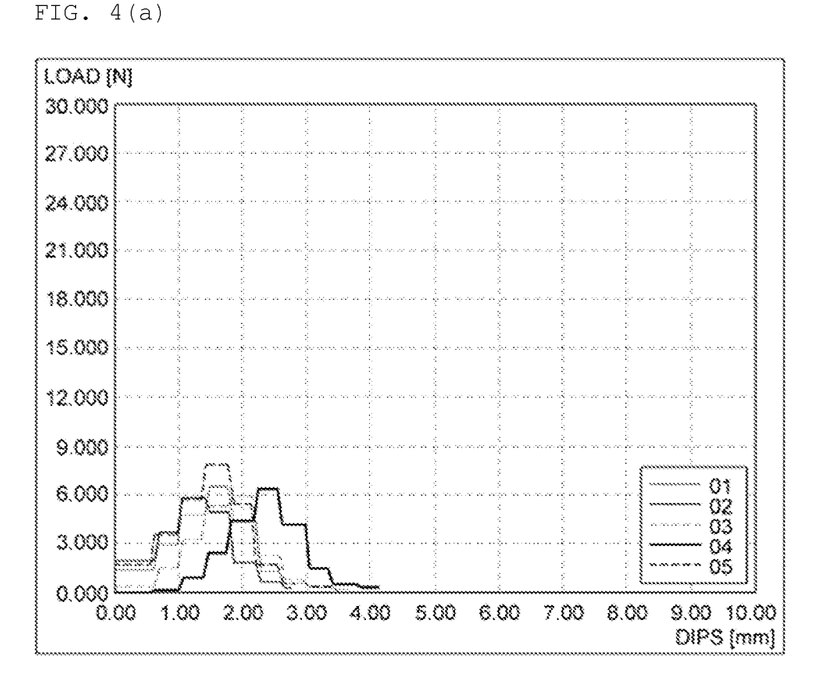
FIG. 4(a) and FIG. 4(b) are graphs illustrating results of the ASTM D4833 test method before and after heat treatment using the copper foil of Embodiment 1.
Figure 4B:
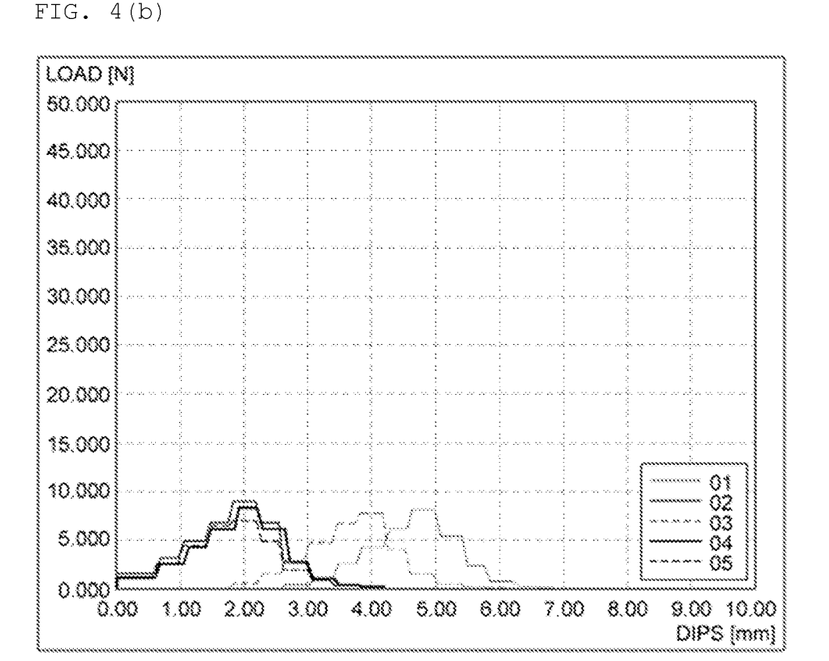

Meanwhile, FIG. 4 is a graph illustrating results of the ASTM 4833 test using the copper foil of Example 1. FIG. 4(*a*) is before heat treatment, and FIG. 4(*b*) is after heat treatment. In such a case, a total of 5 measurements were taken and an average value was taken, and a highest point on each graph is the fracture energy value.

(5) Fracture Energy by Thickness

A fracture energy by thickness (FE) was calculated according to Equation 1 below using the thickness and fracture energy of the copper foil described above.

$$FE = P/T_C \quad \text{[Equation 1]}$$

In Equation 1,

P is a fracture energy value measured according to the ASTM D4833 test method, and $T_C$ is a thickness of a copper foil. In such a case, the thickness of the copper foil was measured in such a manner that the copper foil was cut using a 10 cm×10 cm cutting jig, a weight thereof was then measured, and the thickness was calculated by dividing it by a density of the copper foil.

TABLE 1

|  | Fracture energy by thickness (N/μm) | Fracture energy (N) | Thickness (μm) | Surface roughness (μm) | | Elongation (%) | Tensile strength (kgf/mm²) |
|---|---|---|---|---|---|---|---|
|  |  |  |  | First surface roughness (Drum surface) | Second surface roughness (Electrolyte surface) |  |  |
| Comp. Ex. 1 | 0.33 | 2.10 | 6.3 | 1.22 | 2.55 | 2.2 | 37.5 |
| Comp. Ex. 2 | 0.40 | 3.20 | 8.1 | 1.24 | 2.89 | 3.5 | 36.3 |
| Comp. Ex. 3 | 0.44 | 4.50 | 10.2 | 1.23 | 3.43 | 4.2 | 37.4 |
| Ex. 1 | 1.01 | 6.60 | 6.5 | 1.43 | 1.38 | 5.8 | 34.2 |
| Ex. 2 | 0.88 | 6.97 | 7.8 | 1.56 | 1.31 | 6.2 | 34.9 |
| Ex. 3 | 1.04 | 10.30 | 9.9 | 1.62 | 1.27 | 8.5 | 34.0 |

Experimental Example 2: Evaluation of Physical Properties of Copper Foil after Heat Treatment After the copper foils of Examples 1 to 3 and Comparative Examples 1 to 3 were heat-treated under predetermined conditions, respectively, the corresponding physical properties were evaluated in the same manner as in Experimental Example 1, and the results are shown in Table 2 below.

TABLE 2

|  | Before heat treatment | | After heat treatment (200° C., 10 min.) | | Change rate of fracture energy by thickness after heat treatment/ before heat treatment (%) |
|---|---|---|---|---|---|
|  | Fracture energy by thickness (N/μm) | Fracture energy (N) | Fracture energy by thickness (N/um) | Fracture energy (N) |  |
| Comp. Ex. 1 | 0.33 | 2.10 | 0.51 | 3.20 | 152 |
| Comp. Ex. 2 | 0.40 | 3.20 | 0.64 | 5.20 | 163 |
| Comp. Ex. 3 | 0.44 | 4.50 | 0.70 | 7.10 | 158 |
| Ex. 1 | 1.01 | 6.60 | 1.23 | 8.01 | 121 |
| Ex. 2 | 0.88 | 6.97 | 1.31 | 10.39 | 149 |
| Ex. 3 | 1.04 | 10.30 | 1.32 | 13.10 | 127 |

REFERENCE NUMERAL

100: Copper foil
10a: One surface
10b: Another surface
20: Anti-corrosion layer

What is claimed is:

1. A copper foil consisting of:
   a copper layer; and
   an anti-corrosion layer formed on a first surface and a second surface of the copper layer,
   wherein the anti-corrosion layer comprises an organic anti-corrosion layer or an inorganic anti-corrosion layer,
   wherein the organic anti-corrosion layer comprises a silane compound, a nitrogen compound, or a combination thereof,
   wherein the inorganic anti-corrosion layer comprises chromium (Cr), molybdenum (Mo), or a combination thereof,
   the copper foil is an electrodeposition copper foil formed through electroplating by using an electrolyte, the electrolyte comprises 50 to 150 g/l of copper ions, 50 to 150 g/l of sulfuric acid, chlorine, and additives comprising a sulphonate-based additive, a cellulose-based additive and gelatin,
   and the first surface is a drum surface of the electrodeposition copper foil, and the second surface is an electrolyte surface of the electrodeposition copper foil,
   wherein a fracture energy by thickness (FE) of the copper foil according to the following Equation 1 is 0.5 N/μm or more:

$$FE = P/T_C,$$ [Equation 1]

wherein P is a fracture energy value measured according to ASTM HUANG833 test method, and
   $T_C$ is a thickness of the copper foil,
   wherein a difference in surface roughness between the first surface and the second surface of the copper foil is 0.5 μm or less, and
   a roughness (Rz) of each of the first surface and the second surface of the copper foil is in a range from 0.5 to 4.0 μm.

2. The copper foil of claim 1, wherein a fracture energy by thickness (FE) of the copper foil after heat treatment at 200° C. for 10 minutes is 1.0 N/μm or more.

3. The copper foil of claim 1, wherein a fracture energy by thickness (FE) of the copper foil after heat treatment at 200° C. for 10 minutes is 120% or more of a fracture energy by thickness of the copper foil before the heat treatment.

4. The copper foil of claim 3, wherein the fracture energy by thickness of the copper foil before the heat treatment is in a range from 0.5 to 2.5 N/μm, and
   the fracture energy by thickness of the copper foil after the heat treatment is in a range from 1.0 to 4.0 N/μm.

5. The copper foil of claim 1, having:
   a thickness in a range from 2 to 20 μm;
   a percent elongation of the copper foil measured according to IPC-TM-650 2.4.18 standard in a range from 2 to 30%; and
   a tensile strength of the copper foil in a range from 20 to 70 kgf/mm².

6. The copper foil of claim 1, wherein the copper foil is an electro-deposition copper foil formed through electroplating in which a current is applied between an electrode plate and a rotating drum spaced apart from each other in an electrolyte, and the electrolyte comprises 50 to 150 g/l of copper ions, 50 to 150 g/l of sulfuric acid, and 1,000 ppm or less of TOC (total organic carbon).

7. The copper foil of claim 1, applied as an anode current collector of a lithium secondary battery.

8. The copper foil according to claim 1, having a thickness in a range from 4 to 15 µm.

9. The copper foil according to claim 1, wherein the Rz of each of the one surface and the another surface of the copper foil is in a range from 1.0 to 4.0 µm.

10. The copper foil according to claim 1, wherein the anti-corrosion layer is an organic anti-corrosion layer or an inorganic anti-corrosion layer,
wherein the organic anti-corrosion layer is a silane compound, a nitrogen compound, or a combination thereof,
wherein the inorganic anti-corrosion layer is molybdenum (Mo).

11. An electrode for a secondary battery, comprising:
the copper foil of claim 1, and
an active material layer disposed on the copper foil.

12. The electrode of claim 11, wherein a fracture energy by thickness (FE) of the copper foil after heat treatment at 200° C. for 10 minutes is 1.0 N/µm or more.

13. The electrode of claim 11, wherein a fracture energy by thickness (FE) of the copper foil after heat treatment at 200° C. for 10 minutes is 120% or more of a fracture energy by thickness of the copper foil before the heat treatment.

14. The electrode of claim 13, wherein the fracture energy by thickness of the copper foil before the heat treatment is in a range from 0.5 to 2.5 N/µm, and
the fracture energy by thickness of the copper foil after the heat treatment is in a range from 1.0 to 4.0 N/µm.

15. The electrode of claim 11, wherein the copper foil has:
a thickness in a range from 2 to 20 µm;
a percent elongation of the copper foil measured according to IPC-TM-650 2.4.18 standard in a range from 2 to 30%; and
a tensile strength in a range from 20 to 70 kgf/mm².

16. The electrode of claim 11, wherein the copper foil is an electro-deposition copper foil formed through electroplating in which a current is applied between an electrode plate and a rotating drum spaced apart from each other in an electrolyte, and
the electrolyte comprises 50 to 150 g/l of copper ions, 50 to 150 g/l of sulfuric acid, and 1,000 ppm or less of TOC (total organic carbon).

17. A secondary battery comprising the electrode of claim 11.

18. A copper foil consisting of:
a copper layer; and
an anti-corrosion layer formed on a first surface and a second surface of the copper layer,
wherein the anti-corrosion layer comprises an organic anti-corrosion layer or an inorganic anti-corrosion layer,
wherein the organic anti-corrosion layer comprises a silane compound, a nitrogen compound, or a combination thereof,
wherein the inorganic anti-corrosion layer comprises chromium (Cr), molybdenum (Mo), or a combination thereof,
the copper foil is an electrodeposition copper foil formed through electroplating by using an electrolyte, the electrolyte comprises 50 to 150 g/l of copper ions, 50 to 150 g/l of sulfuric acid, chlorine, and additives comprising a sulphonate-based additive, a cellulose-based additive and gelatin,
and the first surface is a drum surface of the electrodeposition copper foil, and the second surface is an electrolyte surface of the electrodeposition copper foil,
wherein a fracture energy by thickness (FE) of the copper foil according to the following Equation 1 is 0.5 N/µm or more:

$$FE = P/T_C,$$ [Equation 1]

wherein P is a fracture energy value measured according to ASTM HUANG833 test method, and
$T_C$ is a thickness of the copper foil,
wherein a roughness (Rz) of each of the first surface and the second surface of the copper foil is in a range from 0.5 to 4.0 µm,
a thickness of the copper foil is in a range from 2 to 20 µm;
a percent elongation of the copper foil measured according to IPC-TM-650 2.4.18 standard in a range from 2 to 30%; and
a tensile strength of the copper foil in a range from 20 to 70 kgf/mm².

* * * * *